US008483076B2

(12) United States Patent
Zhang

(10) Patent No.: US 8,483,076 B2
(45) Date of Patent: Jul. 9, 2013

(54) A-PERIODIC PUCCH TRANSMISSION ON PUSCH

(75) Inventor: Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 187 days.

(21) Appl. No.: 12/542,509

(22) Filed: Aug. 17, 2009

(65) Prior Publication Data

US 2010/0039953 A1 Feb. 18, 2010

Related U.S. Application Data

(60) Provisional application No. 61/089,849, filed on Aug. 18, 2008, provisional application No. 61/090,718, filed on Aug. 21, 2008.

(51) Int. Cl.
*H04L 12/26* (2006.01)

(52) U.S. Cl.
USPC .......................................................... 370/252

(58) Field of Classification Search
USPC .................... 370/241, 252, 310, 328, 335
See application file for complete search history.

(56) References Cited

U.S. PATENT DOCUMENTS

| 7,912,133 | B2* | 3/2011 | Cheon et al. ............. 375/240.27 |
| 2008/0219370 | A1 | 9/2008 | Onggosanusi et al. |
| 2009/0042511 | A1* | 2/2009 | Malladi ........................... 455/62 |
| 2009/0067391 | A1* | 3/2009 | Shen et al. ..................... 370/336 |
| 2009/0073922 | A1* | 3/2009 | Malladi et al. ................. 370/328 |
| 2009/0196366 | A1* | 8/2009 | Shen et al. ..................... 375/260 |
| 2009/0232070 | A1* | 9/2009 | Muharemovic et al. ....... 370/329 |
| 2009/0232101 | A1* | 9/2009 | Papasakellariou et al. ... 370/335 |
| 2009/0262695 | A1* | 10/2009 | Chen et al. ..................... 370/329 |
| 2009/0262856 | A1* | 10/2009 | Onggosanusi et al. ........ 375/267 |
| 2009/0285193 | A1* | 11/2009 | Kim et al. ...................... 370/342 |
| 2009/0296644 | A1* | 12/2009 | Cheon et al. ................... 370/329 |

(Continued)

FOREIGN PATENT DOCUMENTS

| EP | 1868310 | 12/2007 |
| WO | 2006130541 A2 | 12/2006 |
| WO | 2008022243 | 2/2008 |
| WO | WO2009023850 | 2/2009 |

OTHER PUBLICATIONS

Huawei: "Baseline uplink CQI message—content and size" 3GPP Draft; R1-061820, 3rd Generation Partnership Project (3GPP), Mobile Competence Centre ; 650, Route des Lucioles ; F-06921 Sophia-Antipolis Cedex ; France, vol. RAN WG1, no. Cannes, France; 20060620, Jun. 20, 2006 , XP050111637 [retrieved on Jun. 20, 2006].

(Continued)

*Primary Examiner* — Chi Pham
*Assistant Examiner* — Robert Lopata
(74) *Attorney, Agent, or Firm* — Kenneth Vu

(57) ABSTRACT

Systems and methodologies are described that facilitate decoding of a sub-frame related to a Physical Uplink Shared Channel (PUSCH) transmission. In particular, a Rank Indicator (RI) can be decoded and identified without error which can result in an error-free decoding and identification of Channel Quality Indicator (CQI), a starting point for a portion of data within the Physical Uplink Shared Channel (PUSCH) transmission, and an acknowledgement (ACK). Additionally, systems and methodologies are described related to packaging information within a sub-frame of a Physical Uplink Shared Channel (PUSCH) transmission such that decoding can be employed without error.

34 Claims, 10 Drawing Sheets

U.S. PATENT DOCUMENTS

| | | | |
|---|---|---|---|
| 2010/0067461 A1* | 3/2010 | Kwak et al. | 370/329 |
| 2011/0009148 A1* | 1/2011 | Kotecha | 455/513 |
| 2011/0092240 A1* | 4/2011 | Aiba et al. | 455/509 |
| 2011/0128879 A1* | 6/2011 | Cheon et al. | 370/252 |

OTHER PUBLICATIONS

Huawei: "CQI and PMI resource management" 3GPP Draft; R1-074233, 3rd Generation Partnership Project (3GPP), Mobile Competence Centre ; 650, Route des Lucioles ; F-06921 Sophia-Antipolis Cedex ; France, vol. RAN WG1, no. Shanghai, China; 20071002, Oct. 2, 2007, XP050107759 [retrieved on Oct. 2, 2007].

International Search Report and Written Opinion—PCT/US2009/054192—ISA/EPO—Jan. 27, 2010.

LG Electronics: "Remaining Issues on UE feedback" 3GPP Draft; R1-081821, 3rd Generation Partnership Project (3GPP), Mobile Competence Centre ; 650, Route des Lucioles ; F-06921 Sophia-Antipolis Cedex ; France, vol. RAN WG1, no. Kansas City, USA; 20080514, May 14, 2008, XP050110197 [retrieved on May 14, 2008].

"3rd Generation Partnership Project; Technical Specification Group Radio Access Network; Evolved Universal Terrestrial Radio Access (E-UTRA); Multiplexing and channel coding (Release 8)" 3GPP Standard; 3GPP TS 36.212, 3RD Generation Partnership Project (3GPP), Mobile Competence Centre; 650, Route Des Lucioles ; F06921 Sophia-Antipolis Cedex France, No. V8.3.0, 1 May 2008, pp. 148, XP050377549, p. 33.

LG Electronics: "Multiplexing of Rank, CQI and Data in PUSCH", 3GPP TSG RAN WG1#52bis R1-081255, Apr. 4, 2008.

Motorola: "CR for avoiding error conditions in CQI/PMI/RI and Uplink data multiplexing", [online], 3GPP TSG-RAN WG1#54 R1-083219, Aug. 12, 2008, <URL:http://www.3gpp.org/ftp/tsg_ran/WG1_RL1/TSGR1_54/Docs/R1-083219.zip>.

Texas Instruments: "Coding of Control Information on PUSCH" [online], 3GPP TSG-RAN WG1#52bis, R1-081370, Mar. 31, 2008, <URL:http://www.3gpp.org/ftp/tsg_ra>.

* cited by examiner

A-PERIODIC PUCCH TRANSMISSION ON PUSCH

CROSS-REFERENCE TO RELATED APPLICATIONS

This application claims the benefit of U.S. Provisional Patent application Ser. No. 61/089,849 entitled "A METHOD AND APPARATUS FOR TRANSMITTING PUCCH ON PUSCH IN A WIRELESS COMMUNICATION SYSTEM" which was filed Aug. 18, 2008. This application also claims the benefit of U.S. Provisional Patent application Ser. No. 61/090,718 entitled "A METHOD AND APPARATUS FOR TRANSMITTING PUCCH ON PUSCH IN A WIRELESS COMMUNICATION SYSTEM" which was filed Aug. 21, 2008. The entireties of the aforementioned applications are herein incorporated by reference.

BACKGROUND

I. Field

The following description relates generally to wireless communications, and more particularly to decoding a Physical Uplink Shared Channel (PUSCH) transmission in order to identify Rank Indicator (RI) without error.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Area tracking within a wireless communication system enables a tracking area location for user equipment (e.g., mobile device, mobile communication apparatus, cellular device, smartphone, etc.) to be defined. Typically, a network can request or page the user equipment (UE) in which the UE can respond with such tracking area location. This enables the tracking area location of the UE to be communicated and updated to the network.

In a wireless communication system, with a-periodic Physical Uplink Control Channel (PUCCH), the Channel Quality Indicator (CQI) payload size and the corresponding occupied resources depend on a Rank Indicator (RI). When the Rank Indicator (RI) is in error, it will have impact either on data decoding or the implementation complexity. In other words, if the Rank Indicator (RI) is not decoded properly and is in error, then various segments of the Physical Uplink Shared Channel (PUSCH) transmission will be in error (e.g., the Channel Quality Indicator (CQI), a portion of data-corresponding resources, the acknowledgement (ACK), etc.).

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates identifying Rank Indicator (RI) within a Physical Uplink Shared Channel (PUSCH) transmission. The method can include receiving a Physical Uplink Shared Channel (PUSCH) transmission that includes at least one of a Rank Indicator (RI), a Channel Quality Indicator (CQI), a portion of data, or an acknowledgement (ACK). Further, the method can include employing a decoding technique in order to detect the Rank Indicator (RI), wherein the decoding technique is at least one of a sequential decoding, a parallel decoding, or a hybrid decoding. Moreover, the method can comprise identifying a starting point of the portion of data based upon the detected Rank Indicator (RI) such that the starting point of the portion of data is without error.

Another aspect relates to a wireless communications apparatus. The wireless communications apparatus can include at least one processor configured to receive a Physical Uplink Shared Channel (PUSCH) transmission that includes at least one of a Rank Indicator (RI), a Channel Quality Indicator (CQI), a portion of data, or an acknowledgement (ACK), utilize a decoding technique in order to decode the Rank Indicator (RI), wherein the decoding technique is at least one of a sequential decoding, a parallel decoding, or a hybrid decoding, and locate a starting point of the portion of data based upon the detected Rank Indicator (RI) such that the starting point of the portion of data is without error. Further, the wireless communications apparatus can include memory coupled to the at least one processor.

Yet another aspect relates to a wireless communications apparatus that identifies Rank Indicator (RI) within a Physical Uplink Shared Channel (PUSCH) transmission. The wireless communications apparatus can include means for receiving a Physical Uplink Shared Channel (PUSCH) transmission that includes at least one of a Rank Indicator (RI), a Channel Quality Indicator (CQI), a portion of data, or an acknowledgement (ACK). Additionally, the wireless communications apparatus can comprise means for employing a decoding technique in order to detect the Rank Indicator (RI), wherein the decoding technique is at least one of a sequential decoding, a parallel decoding, or a hybrid decoding. Further, the wireless communications apparatus can comprise means for identifying a starting point of the portion of data based upon the detected Rank Indicator (RI) such that the detected starting point of the portion of data is without error.

Still another aspect relates to a computer program product comprising a computer-readable medium having stored thereon code causing at least one computer to receive a Physical Uplink Shared Channel (PUSCH) transmission that includes at least one of a Rank Indicator (RI), a Channel Quality Indicator (CQI), a portion of data, or an acknowledgement (ACK), utilize a decoding technique in order to decode the Rank Indicator (RI), wherein the decoding technique is at least one of a sequential decoding, a parallel decoding, or a hybrid decoding, and locate a starting point of the portion of data based upon the detected Rank Indicator (RI) such that the starting point of the portion of data is without error.

According to other aspects, a method that facilitates creating a package of information that enables error-free decoding related to a Physical Uplink Shared Channel (PUSCH) transmission. The method can comprise selecting a packaged arrangement for a Physical Uplink Shared Channel (PUSCH) transmission within a sub-frame, wherein the packaged arrangement includes to at least two or more of a Rank Indicator (RI), a Channel Quality Indicator (CQI), a portion of data, or an acknowledgement (ACK). Further, the method can comprise organizing at least two or more of the Rank Indicator (RI), the Channel Quality Indicator (CQI), the portion of data, or the acknowledgement (ACK) based upon the selected packaged arrangement in order to enable decoding of the Physical Uplink Shared Channel (PUSCH) transmission without error. Moreover, the method can include communicating the packaged arrangement to a eNodeB, wherein the packaged arrangement enables the eNodeB to decode the Rank Indicator (RI) without error.

Another aspect relates to a wireless communications apparatus. The wireless communications apparatus can include at least one processor configured to create a package of data for a Physical Uplink Shared Channel (PUSCH) transmission within a sub-frame, wherein the package of data includes to at least two or more of a Rank Indicator (RI), a Channel Quality Indicator (CQI), a portion of data, or an acknowledgement (ACK), organize the package of data in an arrangement such that a decoding of the Physical Uplink Shared Channel (PUSCH) transmission is made without error, and communicate the packaged arrangement to a eNodeB, wherein the packaged arrangement enables the eNodeB to decode the Rank Indicator (RI) without error. Further, the wireless communications apparatus can include memory coupled to the at least one processor.

Another aspect relates to a wireless communications apparatus that creates a package of information that enables error-free decoding related to a Physical Uplink Shared Channel (PUSCH) transmission. The wireless communications apparatus can comprise means for selecting a packaged arrangement for a Physical Uplink Shared Channel (PUSCH) transmission within a sub-frame, wherein the packaged arrangement includes to at least two or more of a Rank Indicator (RI), a Channel Quality Indicator (CQI), a portion of data, or an acknowledgement (ACK). Moreover, the wireless communications apparatus can comprise means for organizing at least two or more of the Rank Indicator (RI), the Channel Quality Indicator (CQI), the portion of data, or the acknowledgement (ACK) based upon the selected packaged arrangement in order to enable decoding of the Physical Uplink Shared Channel (PUSCH) transmission without error. Further, the wireless communications apparatus can include means for communicating the packaged arrangement to a eNodeB, wherein the packaged arrangement enables the eNodeB to decode the Rank Indicator (RI) without error.

Still another aspect relates to a computer program product comprising a computer-readable medium having stored thereon code for causing at least one computer to create a package of data for a Physical Uplink Shared Channel (PUSCH) transmission within a sub-frame, wherein the package of data includes to at least two or more of a Rank Indicator (RI), a Channel Quality Indicator (CQI), a portion of data, or an acknowledgement (ACK), organize the package of data in an arrangement such that a decoding of the Physical Uplink Shared Channel (PUSCH) transmission is made without error, and communicate the packaged arrangement to a eNodeB, wherein the packaged arrangement enables the eNodeB to decode the Rank Indicator (RI) without error.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
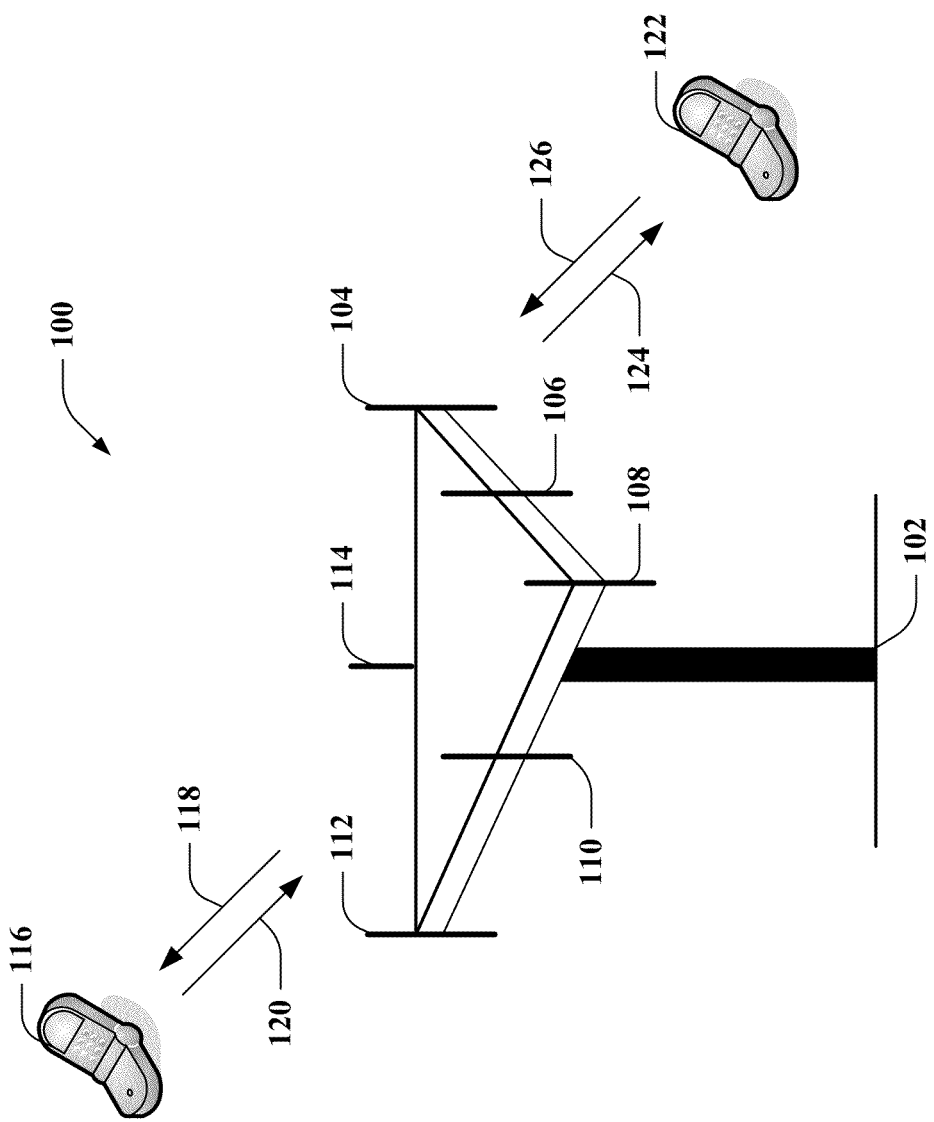
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "carrier," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject innovation provides a decoding technique and packing technique in order to decode a Physical Uplink Shared Channel (PUSCH) transmission without error. In particular, the systems and/or methodologies enable a Rank Indicator (RI) to be decoded and identified without error which results in an error-free decoding of Channel Quality Indicator (CQI), a starting point for a portion of data within the Physical Uplink Shared Channel (PUSCH) transmission, and an acknowledgement (ACK). Furthermore, the subject innovation describes packaging techniques in which the Rank Indicator (RI), the Channel Quality Indicator (CQI), the portion of data within the Physical Uplink Shared Channel (PUSCH) transmission, and the acknowledgment (ACK) can be combined in order to facilitate decoding such information without error.

Figure 2:
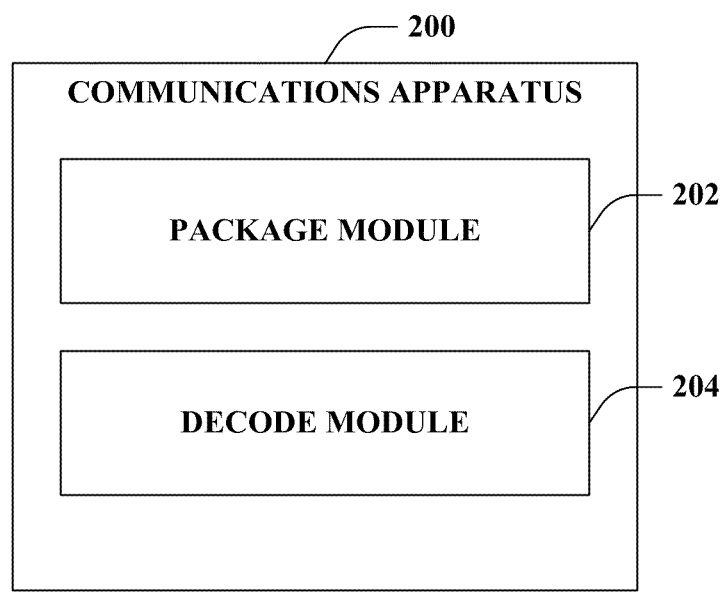
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 employ components described below to accurately decode Rank Indicator (RI) related to a Physical Uplink Shared Channel (PUSCH) transmission.

The communications apparatus 200 can include a package module 202 and/or a decode module 204. The package module 202 can employ various packaging techniques that construct a sub-frame with data in a particular manner. Specifically, the Rank Indicator (RI), the Channel Quality Indicator (CQI), a portion of data, and an acknowledgement (ACK) can be packaged within the sub-frame in specific formats, wherein such formats can facilitate decoding of the sub-frame at an eNodeB, base station, NodeB, and the like.

The decode module 204 can employ decoding techniques such as, but not limited to, a sequential decoding, a parallel decoding, and a hybrid decoding (described in more detail below). In general, the decode module 204 can enable error-free decoding of a Rank Indicator (RI), wherein such error-free decoding of the Rank Indicator (RI) enables error-free decoding of the remainder of information within the sub-frame (e.g., Channel Quality Indicator (CQI), a portion of data, an acknowledgment (ACK), etc.).

In a wireless communication system, with a-periodic PUCCH, the Channel quality indicator (CQI) payload size and the corresponding occupied resources depend on a rank indicator (RI). When the RI is in error, it will have impact either on data decoding or the implementation complexity.

In current wireless communication system provides that there is one bit in downlink control information (DCI) format 0 to signal the CQI request on PUSCH. If the CQI request bit is on the UE reports current RI and CQI while transmitting the UL-SCH data. This PUSCH transmission may contain (Data+CQI+RI) or (CQI+RI only) or ACK may be transmitted in this sub-frame if there is a corresponding DL-SCH transmission.

If PUSCH transmission contains Data+CQI+RI (and possibly ACK), then 1) RI bits are inserted two symbols before and after the pilot symbols starting from the last sub-carrier in the assigned sub-carriers; 2) Data and CQI bits are concatenated by placing CQI first before the channel interleaving; 3) Data and CQI are inserted in the subframe moving from one-subcarrier to another by spanning entire sub-frame first and around RI symbols; and 4) ACK bits are inserted on the symbols next to pilot symbols starting from the last sub-carrier in the assignment and puncturing data and possibly CQI.

The CQI payload size is a function of RI when the UE is configured in closed-loop spatial multiplexing mode, wherein RI=1 corresponds to one payload size and RI>1 corresponds to another payload size. The number of symbols occupied by CQI therefore depends on the RI.

In an aspect UE Tx behavior may be to calculate the number of symbols occupied by CQI according to its RI transmitted in that sub-frame and perform data rate matching while taking the resources occupied by CQI accordingly. Different RI thus results into different number of resources taken by CQI.

An e-NB (i.e. base station) receive solutions according to some aspects.

According to an aspect, Sequential Decoding: 1) Perform RI detection first; and 2) Based on the RI value, perform CQI decoding and data decoding (If RI is in error, CQI will be in error and more importantly the starting point of data will be in error, thus resulting in the error of the entire PUSCH data for the current transmission as well as all retransmissions).

According to an aspect, Parallel Decoding: 1) Perform RI detection, CQI and data decoding in parallel; 2) Blind decoding of CQI and data by assuming (RI=1 and RI>1); 3) No error propagation due to RI in error, however, the blind decoding of data will carry over for all retransmissions until the max retransmission number is reached or the CRC passes (Significant overhead and complexity in implementation).

According to an aspect, Hybrid Decoding: 1) Perform RI detection and CQI decoding in parallel; 2) Blind decoding of CQI by assuming (RI=1 and RI>1); 3) if the CQI CRC checks and the RI corresponding to this hypothesis is consistent with the decoded RI, proceed to data decoding. Otherwise declare the RI and CQI in error and zero out the entire log likelihood ratio (LLRs) corresponding to data transmission in this sub-frame. Thus, no error propagation due to RI in error at the waste of the current transmission and no need for double buffering for LLRs.

In order to avoid the error propagation and implementation complexity with decoding methods described above, hereinafter described solutions according to some aspects.

In an aspect: insert CQI bits towards the end of the sub-frame; data rate-matches around CQI; when RI is in error, the redundancy version (RV) pattern of data will not be in error (the LLRs corresponding to the actual CQI bits will be in error or get zeroed out which can be recovered by coding and/or retransmissions; the RV is used to figure out what are transmitted coded bits which then allow us to find the LLR of each info bits. If the RV is wrong, there is no way to decode the packet); option 1A: Keep RI and ACK symbols positions as they are (ACK punctures CQI); 1B: insert ACK symbols starting from the first sub-carrier in the assigned bandwidth while keeping RI positions unchanged (ACK may puncture systematic bits of data); 1C: Insert both RI and ACK symbols starting from the first sub-carrier in the assigned bandwidth (ACK may puncture systematic bits of data).

In an aspect: Calculate the payload size of CQI corresponding to RI=1 and RI>1; Always rate match data around CQI by assuming the larger payload size of CQI (UE rate matches the CQI by assuming the resources corresponding to the larger payload size); the CQI symbol positions in the sub-frame are fixed (no impact on the RV pattern of data as it does not depend on RI).

In an aspect: For UEs configured in closed-loop spatial multiplexing mode, CQI punctures data instead of being rate matched around; Zeroing out data LLRs corresponding to the decoded RI (If RI is in error, some of the LLRs will be in error which can be recovered by coding and/or retransmissions); CQI may puncture some systematic bits of data (This can be avoided by linking a-periodic CQI flag in DCI format 0 to another RV for data transmission); no impact on the RV pattern of data.

In an aspect: Data and CQI have different mapping direction in the sub-frame (Insert CQI bits towards one end of the sub-frame. Data rate-matches around CQI by starting from the other end of the sub-frame).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, although not shown, it is to be appreciated that communications apparatus 200 can include memory that retains instructions with respect to receiving a Physical Uplink Shared Channel (PUSCH) transmission that includes at least one of a Rank Indicator (RI), a Channel Quality Indicator (CQI), a portion of data, or an acknowledgement (ACK), employing a decoding technique in order to detect the Rank Indicator (RI), wherein the decoding technique is at least one of a sequential decoding, a parallel decoding, or a hybrid decoding, identifying a starting point of the portion of data based upon the detected Rank Indicator (RI) such that the detected Rank Indicator (RI) is without error and the starting point of the portion of data is without error, and the like. Further, communications apparatus 200 can include a processor that may be utilized in connection with executing instructions (e.g., instructions retained within memory, instructions obtained from a disparate source, . . . ).

Additionally, although not shown, it is to be appreciated that communications apparatus 200 can include memory that retains instructions with respect to selecting a packaged arrangement for a Physical Uplink Shared Channel (PUSCH) transmission within a sub-frame, wherein the packaged arrangement includes to at least two or more of a Rank Indicator (RI), a Channel Quality Indicator (CQI), a portion of data, or an acknowledgement (ACK), organizing at least two or more of the Rank Indicator (RI), the Channel Quality Indicator (CQI), the portion of data, or the acknowledgement (ACK) based upon the selected packaged arrangement in order to enable decoding of the Physical Uplink Shared Channel (PUSCH) transmission without error, communicating the packaged arrangement to a eNodeB, wherein the packaged arrangement enables the eNodeB to decode the Rank Indicator (RI) without error, and the like. Further, communications apparatus 200 can include a processor that may be utilized in connection with executing instructions (e.g., instructions retained within memory, instructions obtained from a disparate source, . . . ).

Figure 3:
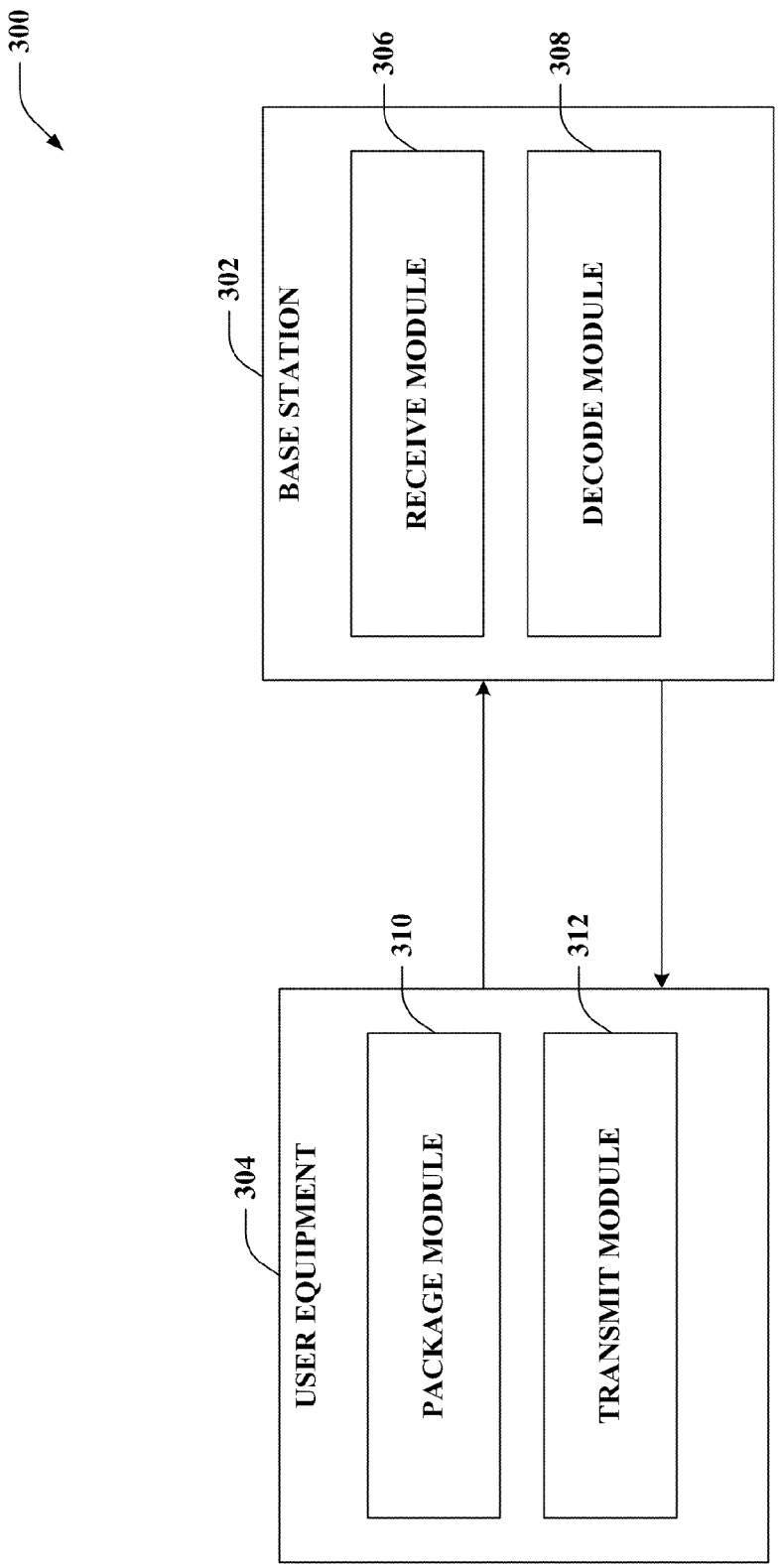
FIG. 3 is an illustration of an example wireless communications system that facilitates decoding a sub-frame related to a Physical Uplink Shared Channel (PUSCH) transmission without error.

Now referring to FIG. 3, illustrated is a wireless communications system 300 that can provide decoding of a sub-frame related to a Physical Uplink Shared Channel (PUSCH) transmission without error. The system 300 includes a base station 302 that communicates with a user equipment 304 (and/or any number of disparate user equipment (not shown)). Base station 302 can transmit information to user equipment 304 over a forward link channel; further base station 302 can receive information from user equipment 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the user equipment 304 as well and vice versa, in one example; the configuration depicted excludes these components for ease of explanation.

Base station 302 includes a receive module 306 that can receive a sub-frame related to a Physical Uplink Shared Channel (PUSCH) transmission, wherein the sub-frame includes at least one of a Rank Indicator (RI), a Channel Quality Indicator (CQI), a portion of data, or an acknowledgement (ACK). The base station 302 can further include a decode module 308 that can employ a decoding technique that enables error-free decoding and identification of a portion of the Physical Uplink Shared Channel (PUSCH) transmission. In particular, the decode module 308 can utilize a decoding technique in order to decode the sub-frame and at least one of a Rank Indicator (RI), a Channel Quality Indicator (CQI), a portion of data, or an acknowledgement (ACK). It is to be appreciated that the decode module 308 can leverage any suitable decoding technique such as, but not limited to, a sequential decoding technique, a parallel decoding technique, and/or a hybrid decoding technique.

User equipment 304 includes a package module 310 that can create a package of information related to the Physical Uplink Shared Channel (PUSCH) transmission, wherein the package of information enables error-free decoding of at least one of a Rank Indicator (RI), a Channel Quality Indicator (CQI), a portion of data, or an acknowledgement (ACK). For example, the package module 310 can construct the package of information such that at least one of the Rank Indicator (RI), the Channel Quality Indicator (CQI), the portion of data, or the acknowledgement (ACK) has a specific location within the package. The user equipment 304 can further include a transmit module 312 that can communicate the created package of information, wherein such constructed and communicated package of information enables error-free decoding of the sub-frame.

In typical TS 36.212, there is one bit in DCI format 0 to signal the CQI request on PUSCH. If the CQI request bit is on the UE reports current RI and CQI while transmitting the UL-SCH data. This PUSCH transmission can include Data+CQI+RI; CQI+RI; ACK may be transmitted in this sub-frame if there is a corresponding DL-SCH transmission.

If PUSCH transmission contains Data+CQI+RI (and possibly ACK) the following can be employed. RI bits can be inserted two symbols before and after the pilot symbols starting from the last sub-carrier in the assigned sub-carriers. Data and CQI bits can be concatenated by placing CQI first before the channel interleaving. Data and CQI can be inserted in the sub-frame moving from one-subcarrier to another by spanning entire sub-frame first and around RI symbols. ACK bits can be inserted on the symbols next to pilot symbols starting from the last sub-carrier in the assignment and puncturing data and possibly CQI.

CQI payload size can be a function of RI when the UE is configured in closed-loop spatial multiplexing mode. RI=1 can correspond to one payload size and RI>1 can correspond to another payload size. The number of symbols occupied by CQI therefore depends on the RI. Traditionally the UE Tx behavior is as follows: calculate the number of symbols occupied by CQI according to its RI transmitted in that sub-frame; perform data rate matching while taking the resources occupied by CQI accordingly; and different RI thus results into different number of resources taken by CQI.

The subject innovation provides accurate decoding technique to identify Rank Indicator (RI) without error. A sequential decoding technique can be provided by the subject innovation. With sequential decoding, the following can be performed: perform RI detection first and based on the RI value, perform CQI decoding and data decoding (e.g., if RI is in error, CQI will be in error and more importantly the starting point of data will be in error, thus resulting in the error of the entire PUSCH data for the current transmission as well as all retransmissions).

The subject innovation can further provide parallel decoding that includes the following: perform RI detection, CQI and data decoding in parallel; blind decoding of CQI and data by assuming RI=1 and RI>1. This technique does not have error propagation due to RI in error, however, the blind decoding of data will carry over for all retransmissions until the max retransmission number is reached or the CRC passes. This technique may have significant overhead and complexity in implementation.

The subject innovation can further provide hybrid decoding that includes the following: perform RI detection and CQI decoding in parallel; and blind decoding of CQI by assuming RI=1 and RI>1. Moreover, if the CQI Circular Redundancy Check (CRC) checks and the RI corresponding to this hypothesis is consistent with the decoded RI, proceed to data decoding. Otherwise declare the RI and CQI in error and zero out all the LLRs corresponding to data transmission in this sub-frame. This provides no error propagation due to RI in error at the waste of the current transmission. In addition, there is no need for double buffering for Log Likelihood Ratios (LLRs).

The subject innovation can further avoid error propagation and implementation complexity as mentioned above. For example, a first solution can be provided that includes the following: insert CQI bits towards the end of the sub-frame; data rate-matches around CQI; when RI is in error, the RV pattern of data will not be in error; and the LLRs corresponding to the actual CQI bits will be in error or get zeroed out which can be recovered by coding and/or retransmissions. Moreover, the RI and ACK symbols positions can be kept as they are (e.g., ACK punctures CQI). Furthermore, ACK symbols can be inserted starting from the first sub-carrier in the assigned bandwidth while keeping RI positions unchanged (e.g., ACK may puncture systematic bits of data). Additionally, both RI and ACK symbols can be inserted starting from the first sub-carrier in the assigned bandwidth (e.g., ACK may puncture systematic bits of data).

A second solution can include the following: calculate the payload size of CQI corresponding to RI=1 and RI>1; rate match data around CQI by assuming the larger payload size of CQI; UE rate matches the CQI by assuming the resources corresponding to the larger payload size; the CQI symbol positions in the sub-frame are fixed; no impact on the RV pattern of data as it does not depend on RI.

A third solution can include the following: for UEs configured in closed-loop spatial multiplexing mode, CQI punctures data instead of being rate matched around; zeroing out data LLRs corresponding to the decoded RI (e.g., if RI is in error, some of the LLRs will be in error which can be recovered by coding and/or retransmissions); CQI may puncture some systematic bits of data (e.g., this can be avoided by linking a-periodic CQI flag in DCI format 0 to another RV for data transmission); and no impact on the RV pattern of data.

A fourth solution can include the following: data and CQI have different mapping direction in the sub-frame; insert CQI bits towards one end of the sub-frame; and data rate-matches around CQI by starting from the other end of the sub-frame.

Moreover, although not shown, it is to be appreciated that base station 302 can include memory that retains instructions with respect to receiving a Physical Uplink Shared Channel (PUSCH) transmission that includes at least one of a Rank Indicator (RI), a Channel Quality Indicator (CQI), a portion of data, or an acknowledgement (ACK), employing a decoding technique in order to detect the Rank Indicator (RI), wherein the decoding technique is at least one of a sequential decoding, a parallel decoding, or a hybrid decoding, identifying a starting point of the portion of data based upon the detected Rank Indicator (RI) such that the detected Rank Indicator (RI) is without error and the starting point of the portion of data is without error, and the like. Further, communications apparatus 200 can include a processor that may be utilized in connection with executing instructions (e.g., instructions retained within memory, instructions obtained from a disparate source, . . . ).

Additionally, although not shown, it is to be appreciated that base station 302 can include memory that retains instructions with respect to selecting a packaged arrangement for a Physical Uplink Shared Channel (PUSCH) transmission within a sub-frame, wherein the packaged arrangement includes to at least two or more of a Rank Indicator (RI), a Channel Quality Indicator (CQI), a portion of data, or an acknowledgement (ACK), organizing at least two or more of the Rank Indicator (RI), the Channel Quality Indicator (CQI), the portion of data, or the acknowledgement (ACK) based upon the selected packaged arrangement in order to enable decoding of the Physical Uplink Shared Channel (PUSCH) transmission without error, communicating the packaged arrangement to a eNodeB, wherein the packaged arrangement enables the eNodeB to decode the Rank Indicator (RI) without error, and the like. Further, communications apparatus 200 can include a processor that may be utilized in connection with executing instructions (e.g., instructions retained within memory, instructions obtained from a disparate source, . . . ).

Figure 4:
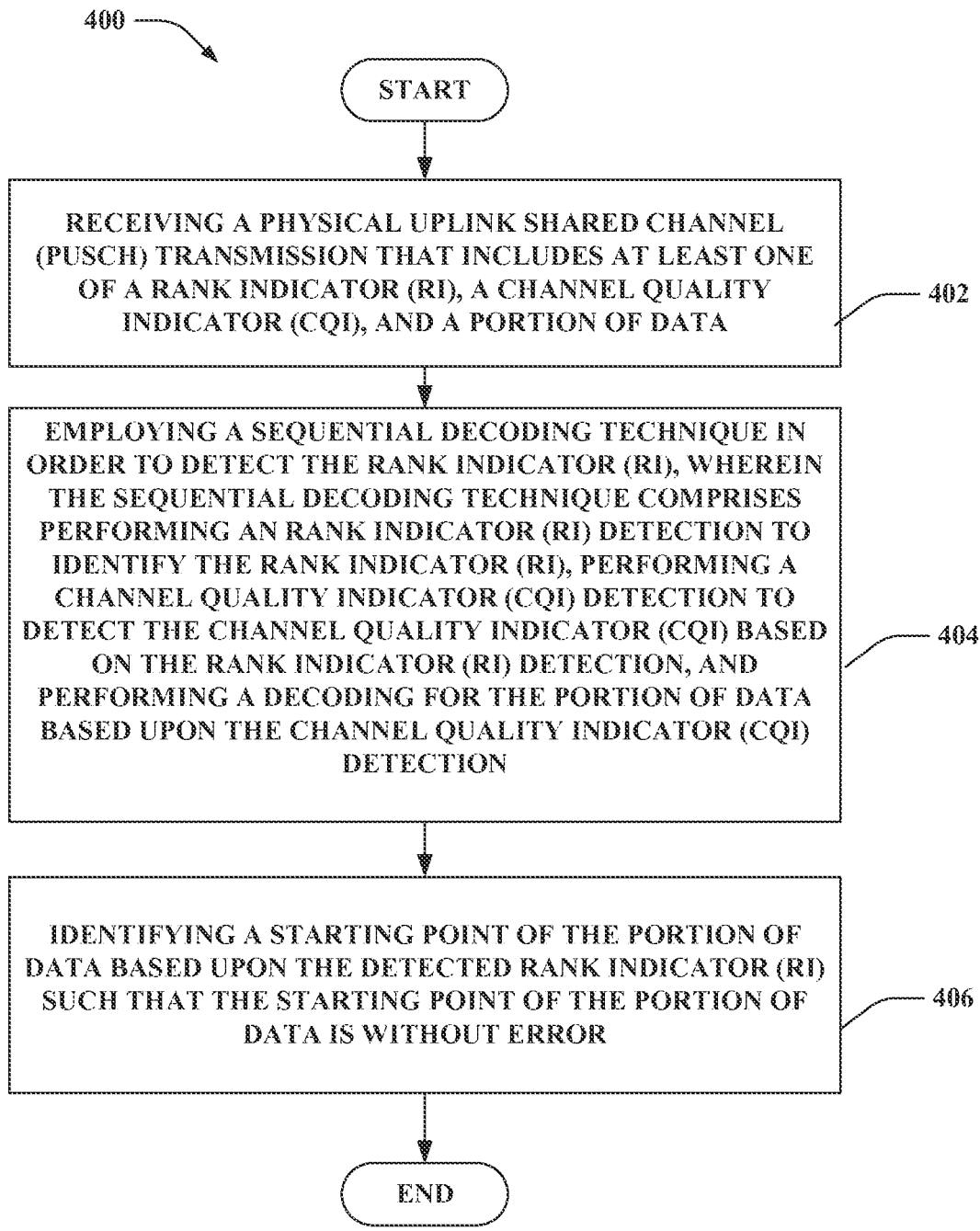
FIG. 4 is an illustration of an example system that facilitates identifying Rank Indicator (RI) within a Physical Uplink Shared Channel (PUSCH) transmission.
Figure 5:
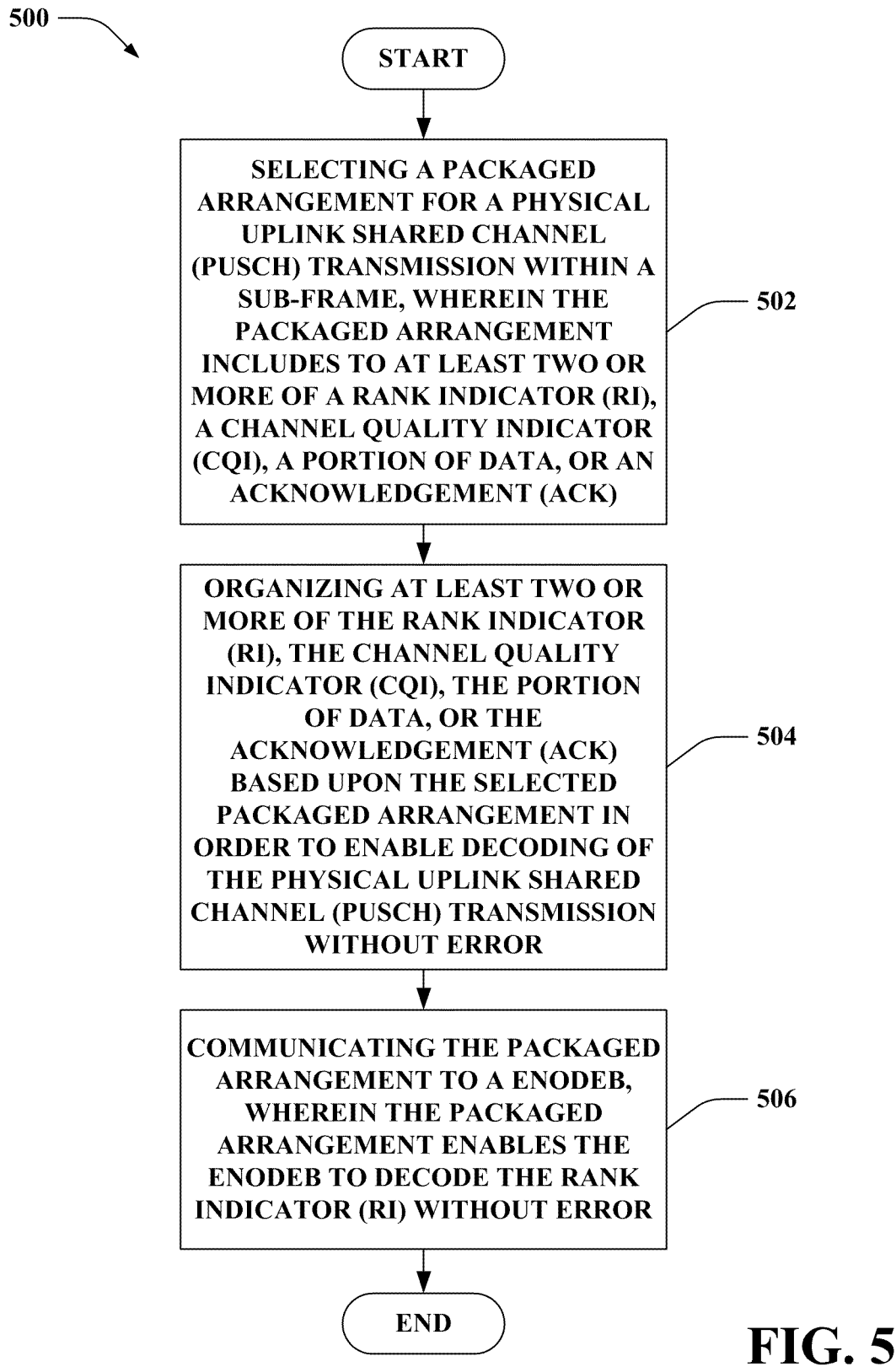
FIG. 5 is an illustration of an example methodology that facilitates creating a package of information that enables error-free decoding related to a Physical Uplink Shared Channel (PUSCH) transmission.

Referring to FIGS. 4-5, methodologies relating to providing uplink timing control while reducing overhead and power consumption are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 4 illustrates a methodology 400 that facilitates identifying Rank Indicator (RI) within a Physical Uplink Shared Channel (PUSCH) transmission. At reference numeral 402, a Physical Uplink Shared Channel (PUSCH) transmission can be received that includes at least one of a Rank Indicator (RI), a Channel Quality Indicator (CQI), a portion of data, or an acknowledgement (ACK). At reference numeral 404, a decoding technique can be employed in order to detect the Rank Indicator (RI), wherein the decoding technique is at least one of a sequential decoding, a parallel decoding, or a hybrid decoding. At reference numeral 406, a starting point of the portion of data can be identified based upon the detected Rank Indicator (RI) such that the detected Rank Indicator (RI) is without error and the starting point of the portion of data is without error.

Turning to FIG. 5, illustrated is a methodology 500 that facilitates creating a package of information that enables error-free decoding related to a Physical Uplink Shared Channel (PUSCH) transmission. At reference numeral 502, a packaged arrangement for a Physical Uplink Shared Channel (PUSCH) transmission within a sub-frame can be selected, wherein the packaged arrangement includes to at least two or more of a Rank Indicator (RI), a Channel Quality Indicator (CQI), a portion of data, or a acknowledgement (ACK). At reference numeral 504, at least two or more of the Rank Indicator (RI), the Channel Quality Indicator (CQI), the portion of data, or the acknowledgement (ACK) can be organized based upon the selected packaged arrangement in order to enable decoding of the Physical Uplink Shared Channel (PUSCH) transmission without error. At reference numeral 506, the packaged arrangement can be communicated to an eNodeB, wherein the packaged arrangement enables the eNodeB to decode the Rank Indicator (RI) without error.

Figure 6:
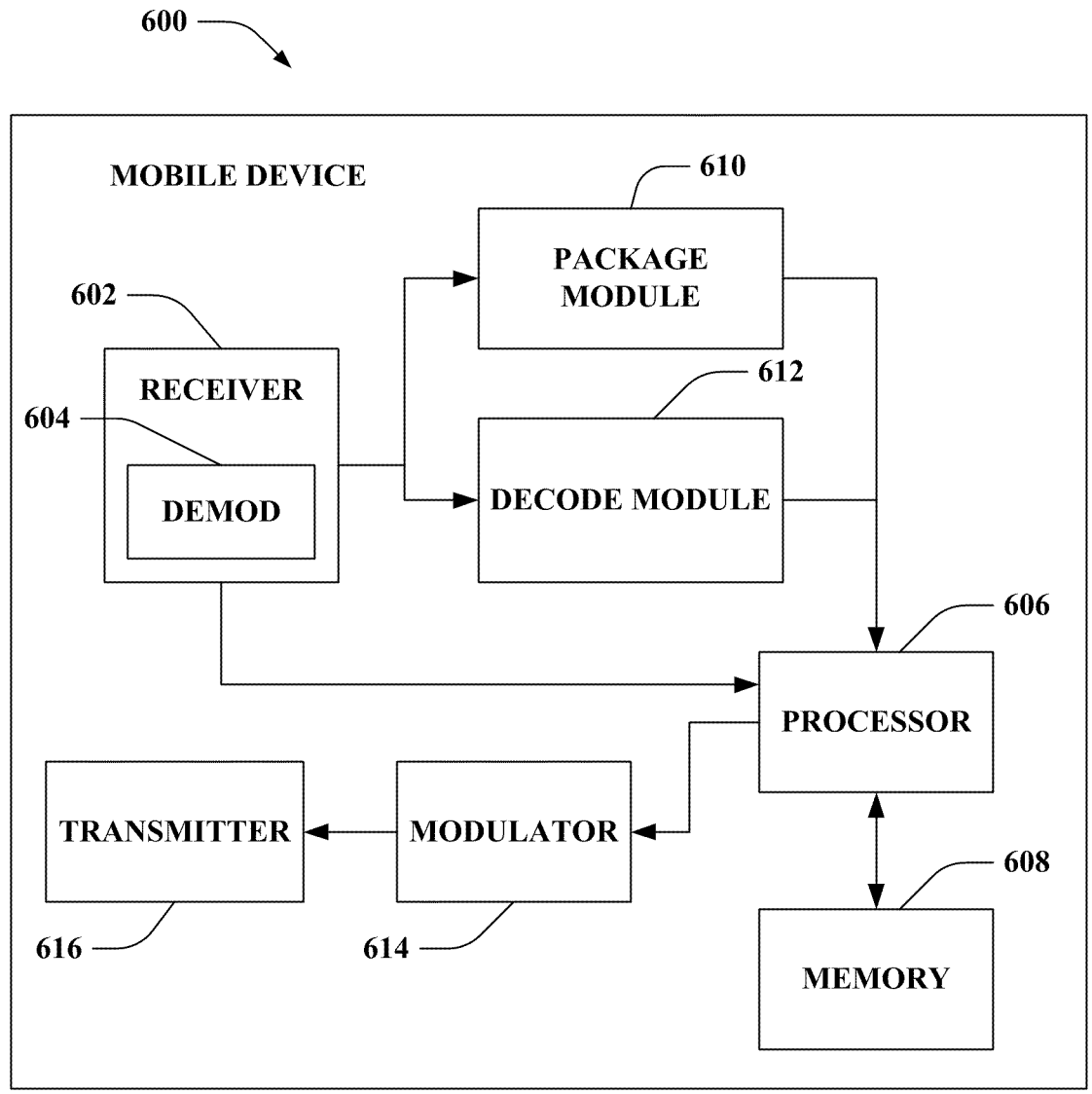
FIG. 6 is an illustration of an example mobile device that facilitates decoding and identifying a Rank Indicator (RI) without error in a wireless communication system.

FIG. 6 is an illustration of a mobile device 600 that facilitates decoding and identifying a Rank Indicator (RI) without error in a wireless communication system. Mobile device 600 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of mobile device 600, and/or a processor that both analyzes information received by receiver 602, generates information for transmission by transmitter 616, and controls one or more components of mobile device 600.

Mobile device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 606 can further be operatively coupled to a package module 610 and/or a decode module 612. The package module 610 can create a package of information that can be constructed with specific locations within the sub-frame for particular portions of the Physical Uplink Shared Channel (PUSCH) transmission. Thus, the package module 610 can construct a package of information with at least one of a Rank Indicator (RI), a Channel Quality Indicator (CQI), a portion of data, or an acknowledgement (ACK) in a particular location within the sub-frame. It is to be appreciated that the construction of the package of information can mitigate decoding errors based on such specified location of data within the sub-frame. The decode module 612 can employ various decoding techniques in order to decode a portion of the sub-frame related to the Physical Uplink Shared Channel (PUSCH) transmission. For example, the decode module 612 can employ at least one of a sequential decoding technique, a parallel decoding technique, a hybrid decoding technique, etc.

Mobile device 600 still further comprises a modulator 614 and transmitter 616 that respectively modulate and transmit signals to, for instance, a base station, another mobile device, etc. Although depicted as being separate from the processor 606, it is to be appreciated that the package module 610, decode module 612, demodulator 604, and/or modulator 614 can be part of the processor 606 or multiple processors (not shown).

Figure 7:
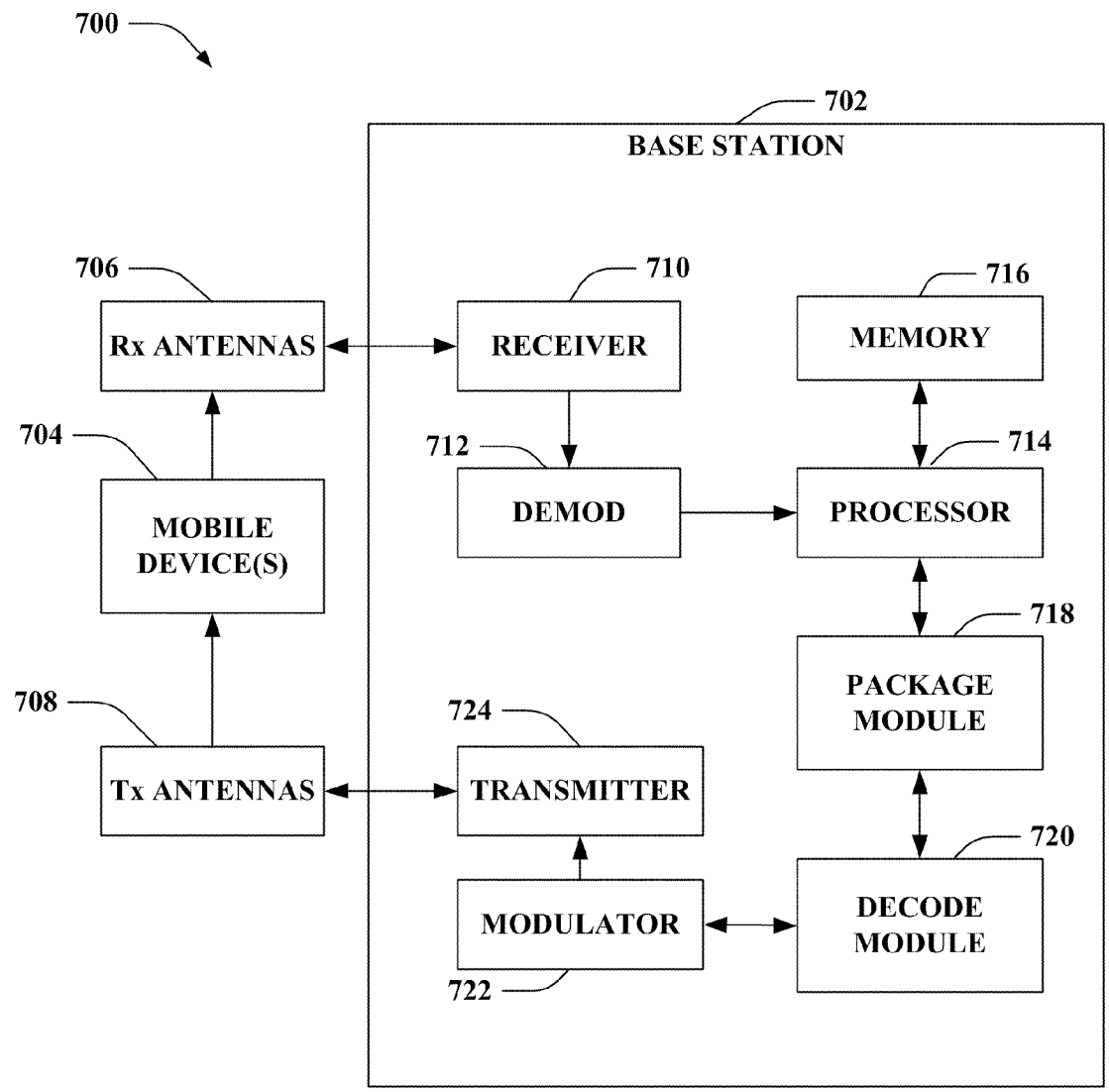
FIG. 7 is an illustration of an example system that facilitates utilizing a decoding technique to detect Rank Indicator (RI) without error in a wireless communication environment.

FIG. 7 is an illustration of a system 700 that facilitates utilizing a decoding technique to detect Rank Indicator (RI) without error in a wireless communication environment as described supra. The system 700 comprises a base station 702 (e.g., access point, . . . ) with a receiver 710 that receives signal(s) from one or more mobile devices 704 through a plurality of receive antennas 706, and a transmitter 724 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein. Processor 714 is further coupled to a timing adjustment determiner 718 that can ascertain if mobile devices 704 require timing updates. Moreover, the processor 714 can be coupled to a timing adjustment evaluator 720 that can generate timing adjustment commands that update timing of mobile device 704 according to the identified need.

The base station 702 can further include a package module 718 and/or a decode module 720. The package module 718 can create a package of information that can be constructed with specific locations within the sub-frame for particular portions of the Physical Uplink Shared Channel (PUSCH) transmission. Thus, the package module 718 can construct a package of information with at least one of a Rank Indicator (RI), a Channel Quality Indicator (CQI), a portion of data, or an acknowledgement (ACK) in a particular location within the sub-frame. It is to be appreciated that the construction of the package of information can mitigate decoding errors based on such specified location of data within the sub-frame. The decode module 720 can employ various decoding techniques in order to decode a portion of the sub-frame related to the Physical Uplink Shared Channel (PUSCH) transmission. For example, the decode module 720 can employ at least one of a sequential decoding technique, a parallel decoding technique, a hybrid decoding technique, etc.

Furthermore, although depicted as being separate from the processor 714, it is to be appreciated that the package module 718, decode module 720, demodulator 712, and/or modulator 722 can be part of the processor 714 or multiple processors (not shown).

Figure 8:
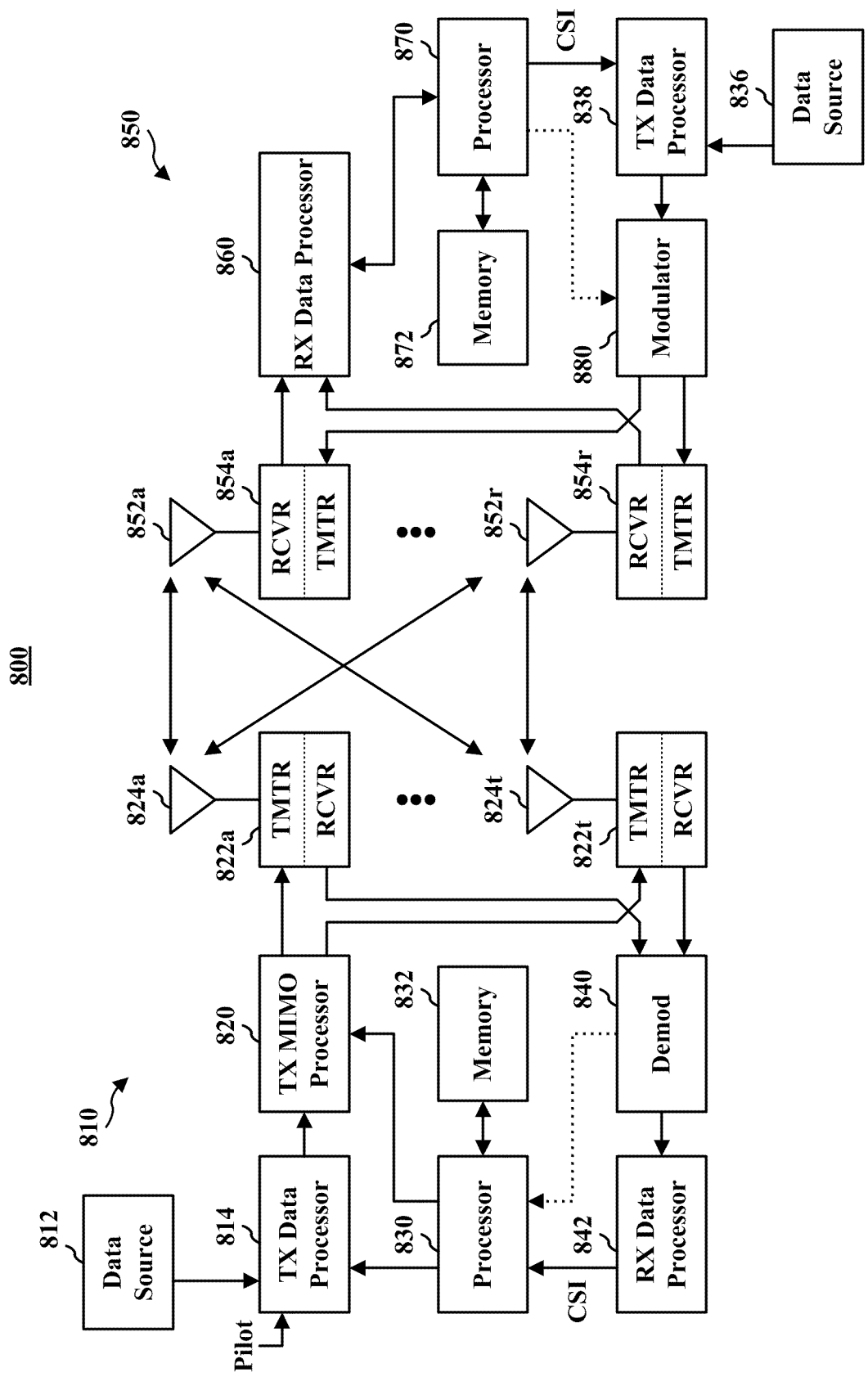
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-3 and 6-7), and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
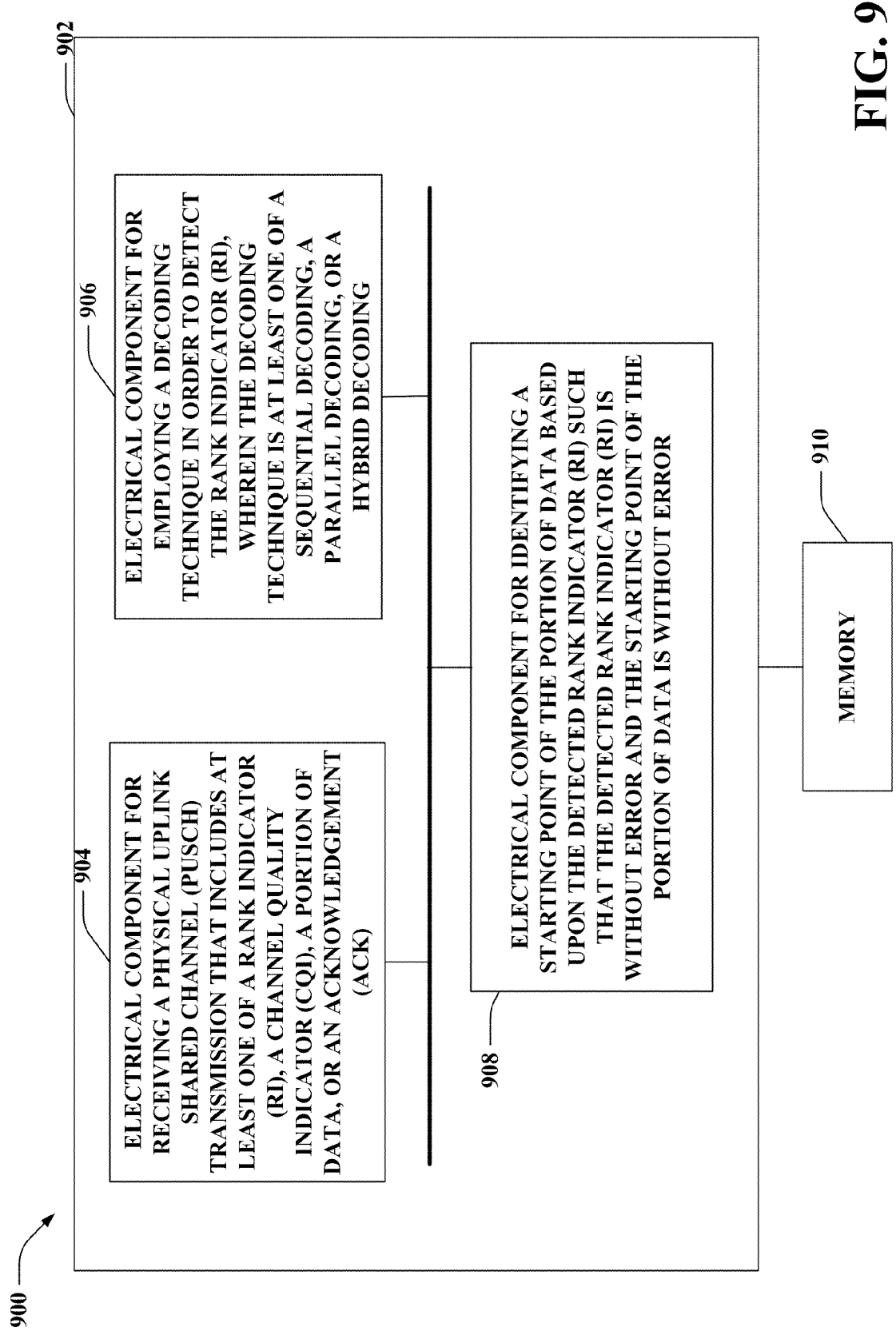
FIG. 9 is an illustration of an example system that facilitates identifying Rank Indicator (RI) within a Physical Uplink Shared Channel (PUSCH) transmission.

With reference to FIG. 9, illustrated is a system 900 that identifies Rank Indicator (RI) within a Physical Uplink Shared Channel (PUSCH) transmission. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. The logical grouping 902 can include an electrical component for receiving a Physical Uplink Shared Channel (PUSCH) transmission that includes at least one of a Rank Indicator (RI), a Channel Quality Indicator (CQI), a portion of data, or an acknowledgement (ACK) 904. In addition, the logical grouping 902 can comprise an electrical component for employing a decoding technique in order to detect the Rank Indicator (RI), wherein the decoding technique is at least one of a sequential decoding, a parallel decoding, or a hybrid decoding 906. Moreover, the logical grouping 902 can include an electrical component for identifying a starting point of the portion of data based upon the detected Rank Indicator (RI) such that the detected Rank Indicator (RI) is without error and the starting point of the portion of data is without error 908. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

Figure 10:
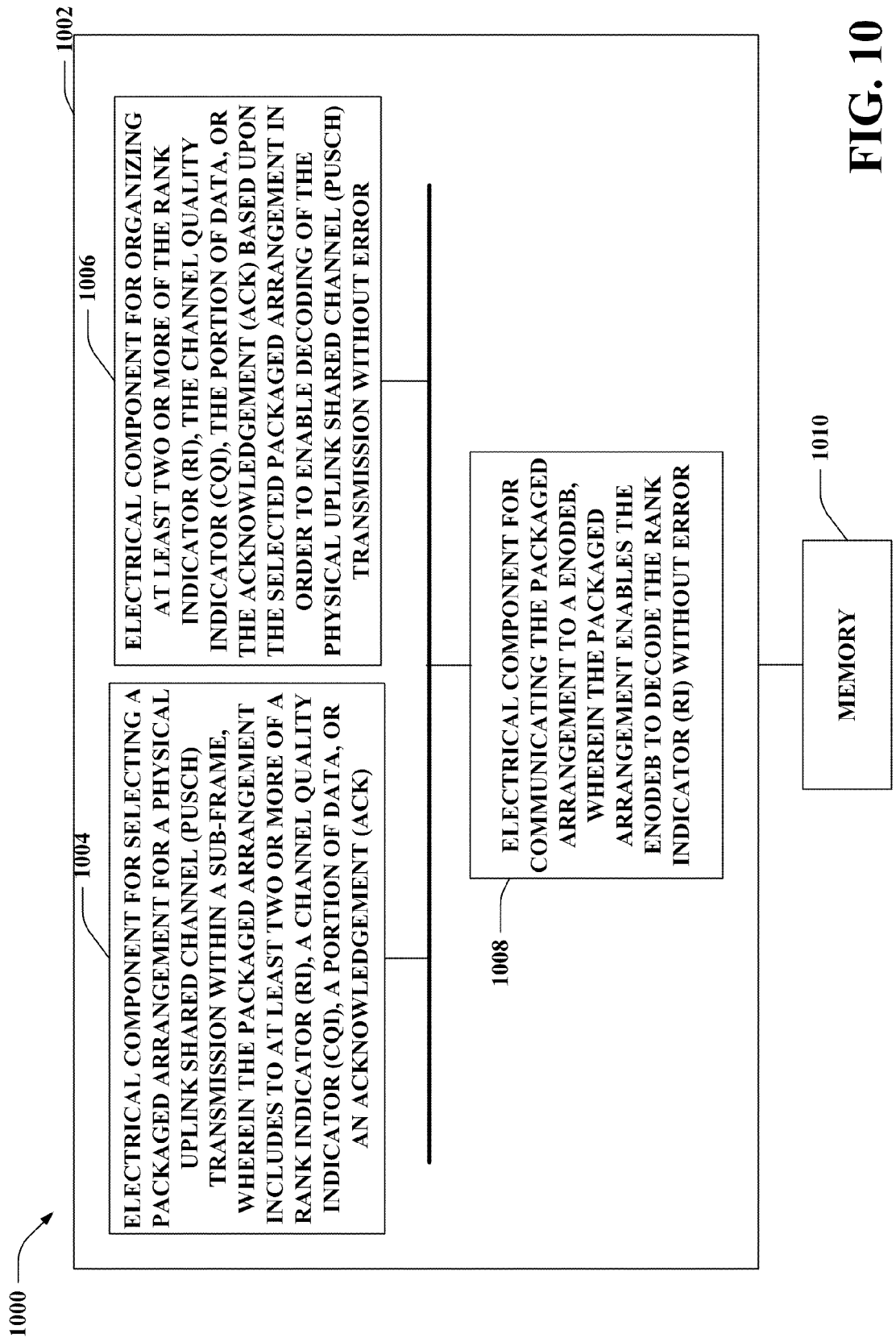
FIG. 10 is an illustration of an example system that creating a package of information that enables error-free decoding related to a Physical Uplink Shared Channel (PUSCH) transmission in a wireless communication environment.

Turning to FIG. 10, illustrated is a system 1000 that creates a package of information that enables error-free decoding related to a Physical Uplink Shared Channel (PUSCH) transmission in a wireless communication environment. System 1000 can reside within a base station, mobile device, etc., for instance. As depicted, system 1000 includes functional blocks that can represent functions implemented by a processor, software, or combination thereof (e.g., firmware). Logical grouping 1002 can include an electrical component for selecting a packaged arrangement for a Physical Uplink Shared Channel (PUSCH) transmission within a sub-frame, wherein the packaged arrangement includes to at least two or more of a Rank Indicator (RI), a Channel Quality Indicator (CQI), a portion of data, or an acknowledgement (ACK) 1004. Moreover, logical grouping 1002 can include an electrical component for organizing at least two or more of the Rank Indicator (RI), the Channel Quality Indicator (CQI), the portion of data, or the acknowledgement (ACK) based upon the selected packaged arrangement in order to enable decoding of the Physical Uplink Shared Channel (PUSCH) transmission without error 1006. Further, logical grouping 1002 can comprise an electrical component for communicating the packaged arrangement to an eNodeB, wherein the packaged arrangement enables the eNodeB to decode the Rank Indicator (RI) without error 1008. Additionally, system 1000 can include a memory 1010 that retains instructions for executing functions associated with electrical components 1004, 1006, and 1008. While shown as being external to memory 1010, it is to be understood that electrical components 1004, 1006, and 1008 can exist within memory 1010.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method used in a wireless communications system that facilitates identifying Rank Indicator (RI) within a Physical Uplink Shared Channel (PUSCH) transmission, comprising:
receiving a Physical Uplink Shared Channel (PUSCH) transmission that includes at least a Rank Indicator (RI), a Channel Quality Indicator (CQI), and a portion of data;
employing a sequential decoding technique in order to detect the Rank Indicator (RI); and
identifying a starting point of the portion of data based upon the detected Rank Indicator (RI) such that the starting point of the portion of data is without error,
wherein the sequential decoding comprises:
performing an Rank Indicator (RI) detection to identify the Rank Indicator (RI);
performing a Channel Quality Indicator (CQI) detection to detect the Channel Quality Indicator (CQI) based on the Rank Indicator (RI) detection; and
performing a decoding for the portion of data based upon the Channel Quality Indicator (CQI) detection.

2. A method used in a wireless communications system that facilitates identifying Rank Indicator (RI) within a Physical Uplink Shared Channel (PUSCH) transmission, comprising:
receiving a Physical Uplink Shared Channel (PUSCH) transmission that includes at least a Rank Indicator (RI), a Channel Quality Indicator (CQI), and a portion of data;
employing a parallel decoding technique in order to detect the Rank Indicator (RI); and
identifying a starting point of the portion of data based upon the detected Rank Indicator (RI) such that the starting point of the portion of data is without error,
wherein the parallel decoding comprises:
performing an Rank Indicator (RI) detection to identify the Rank Indicator (RI);
performing a Channel Quality Indicator (CQI) detection to detect the Channel Quality Indicator (CQI);
performing a decoding for the portion of data; and
performing the Rank Indicator (RI) detection, the Channel Quality Indicator (CQI) detection and the decoding for the portion of data in parallel.

3. The method of claim 2, wherein the detection of the Channel Quality Indicator (CQI) and the portion of data are performed blind based upon the Rank Indicator (RI) is at least one of a value of one or a value greater than one.

4. A method used in a wireless communications system that facilitates identifying Rank Indicator (RI) within a Physical Uplink Shared Channel (PUSCH) transmission, comprising:
receiving a Physical Uplink Shared Channel (PUSCH) transmission that includes at least a Rank Indicator (RI), a Channel Quality Indicator (CQI), and a portion of data;
employing a hybrid decoding technique in order to detect the Rank Indicator (RI); and
identifying a starting point of the portion of data based upon the detected Rank Indicator (RI) such that the starting point of the portion of data is without error,
wherein the hybrid decoding comprises:
performing an Rank Indicator (RI) detection to identify the Rank Indicator (RI);
performing a Channel Quality Indicator (CQI) detection to detect the Channel Quality Indicator (CQI);
performing the Rank Indicator (RI) detection and the Channel Quality Indicator (CQI) detection in parallel, wherein the Channel Quality Indicator (CQI) detected with the Rank Indicator (RI) is at least one of a value of one or a value greater than one;
employing a Channel Quality Indicator (CQI) Circular Redundancy Check (CRC) that provides a corresponding Rank Indicator (RI);
evaluating the identified Rank Indicator (RI) with the corresponding Rank Indicator (RI); and
performing decoding of the portion of data when the identified Rank Indicator (RI) is consistent with the corresponding Rank Indicator (RI).

5. The method of claim 4, further comprising declaring at least one of the Rank Indicator (RI) or the Channel Quality Indicator (CQI) is in error when the identified Rank Indicator (RI) is not consistent with the corresponding Rank Indicator (RI).

6. The method of claim 5, further comprising clearing a Log Likelihood Ratio (LLR) in a sub-frame related to the Physical Uplink Shared Channel (PUSCH) transmission.

7. A method used in a wireless communications system that utilizes a decoding technique, comprising:
receiving a Physical Uplink Shared Channel (PUSCH) transmission that includes a Rank Indicator (RI) and a Channel Quality Indicator (CQI);
calculating a payload size of CQI corresponding to a Rank Indicator (RI) value of one and calculating a payload size of CQI corresponding to a Rank Indicator (RI) value of greater than one; and
rate matching data around the Channel Quality Indicator (CQI) based upon a larger payload size of CQI.

8. A wireless communications apparatus, comprising:
at least one processor configured to:
receive a Physical Uplink Shared Channel (PUSCH) transmission that includes at least a Rank Indicator (RI), a Channel Quality Indicator (CQI), and a portion of data;
utilize a sequential decoding technique in order to decode the Rank Indicator (RI); and
locate a starting point of the portion of data based upon the decoded Rank Indicator (RI) such that the starting point of the portion of data is without error; and
a memory coupled to the at least one processor,
wherein the sequential decoding comprises:
at least one processor configured to:
perform an Rank Indicator (RI) detection to identify the Rank Indicator (RI);
perform a Channel Quality Indicator (CQI) detection to detect the Channel Quality Indicator (CQI) based on the Rank Indicator (RI) detection; and
perform a decoding for the portion of data based upon the Channel Quality Indicator (CQI) detection.

9. A wireless communications apparatus, comprising:
at least one processor configured to:
receive a Physical Uplink Shared Channel (PUSCH) transmission that includes at least a Rank Indicator (RI), a Channel Quality Indicator (CQI), and a portion of data utilize a parallel decoding technique in order to decode the Rank Indicator (RI); and
locate a starting point of the portion of data based upon the decoded Rank Indicator (RI) such that the starting point of the portion of data is without error; and
a memory coupled to the at least one processor,
wherein the parallel decoding comprises:
at least one processor configured to:
perform an Rank Indicator (RI) detection to identify the Rank Indicator (RI);
perform a Channel Quality Indicator (CQI) detection to detect the Channel Quality Indicator (CQI);
perform a decoding for the portion of data; and perform the Rank Indicator (RI) detection, the Channel Quality Indicator (CQI) detection and the decoding for the portion of data in parallel.

10. A wireless communications apparatus, comprising:
at least one processor configured to:
receive a Physical Uplink Shared Channel (PUSCH) transmission that includes at least a Rank Indicator (RI), a Channel Quality Indicator (CQI), and a portion of data
utilize a hybrid decoding technique in order to decode the Rank Indicator (RI); and
locate a starting point of the portion of data based upon the decoded Rank Indicator (RI) such that the starting point of the portion of data is without error; and
a memory coupled to the at least one processor,
wherein the hybrid decoding comprises:
at least one processor configured to:
perform an Rank Indicator (RI) detection to identify the Rank Indicator (RI);
perform a Channel Quality Indicator (CQI) detection to detect the Channel Quality Indicator (CQI);
perform the Rank Indicator (RI) detection and the Channel Quality Indicator (CQI) detection in parallel, wherein the Channel Quality Indicator (CQI) detected with the Rank Indicator (RI) is at least one of a value of one or a value greater than one;
employ a Channel Quality Indicator (CQI) Circular Redundancy Check (CRC) that provides a corresponding Rank Indicator (RI);
evaluate the identified Rank Indicator (RI) with the corresponding Rank Indicator (RI); and
perform decoding of the portion of data when the identified Rank Indicator (RI) is consistent with the corresponding Rank Indicator (RI).

11. A wireless communications apparatus that identifies Rank Indicator (RI) within a Physical Uplink Shared Channel (PUSCH) transmission, comprising:
means for receiving a Physical Uplink Shared Channel (PUSCH) transmission that includes at least a Rank Indicator (RI), a Channel Quality Indicator (CQI), and a portion of data;
means for employing a sequential decoding technique in order to detect the Rank Indicator (RI); and
means for identifying a starting point of the portion of data based upon the decoded Rank Indicator (RI) such that the detected starting point of the portion of data is without error,
wherein the sequential decoding comprises:
means for performing an Rank Indicator (RI) detection to identify the Rank Indicator (RI);
means for performing a Channel Quality Indicator (CQI) detection to detect the Channel Quality Indicator (CQI) based on the Rank Indicator (RI) detection; and
means for performing a decoding for the portion of data based upon the Channel Quality Indicator (CQI) detection.

12. A wireless communications apparatus that identifies Rank Indicator (RI) within a Physical Uplink Shared Channel (PUSCH) transmission, comprising:
means for receiving a Physical Uplink Shared Channel (PUSCH) transmission that includes at least a Rank Indicator (RI), a Channel Quality Indicator (CQI), and a portion of data;
means for employing a parallel decoding technique in order to detect the Rank Indicator (RI); and
means for identifying a starting point of the portion of data based upon the decoded Rank Indicator (RI) such that the detected starting point of the portion of data is without error,
wherein the parallel decoding comprises:
means for performing an Rank Indicator (RI) detection to identify the Rank Indicator (RI);
means for performing a Channel Quality Indicator (CQI) detection to detect the Channel Quality Indicator (CQI);
means for performing a decoding for the portion of data; and
means for performing the Rank Indicator (RI) detection, the Channel Quality Indicator (CQI) detection and the decoding for the portion of data in parallel.

13. The wireless communications apparatus of claim 12, wherein the detection of the Channel Quality Indicator (CQI) and the portion of data are performed blind based upon the Rank Indicator (RI) is at least one of a value of one or a value greater than one.

14. A wireless communications apparatus that identifies Rank Indicator (RI) within a Physical Uplink Shared Channel (PUSCH) transmission, comprising:
means for receiving a Physical Uplink Shared Channel (PUSCH) transmission that includes at least a Rank Indicator (RI), a Channel Quality Indicator (CQI), and a portion of data;
means for employing a hybrid decoding technique in order to detect the Rank Indicator (RI); and
means for identifying a starting point of the portion of data based upon the decoded Rank Indicator (RI) such that the detected starting point of the portion of data is without error,
wherein the hybrid decoding comprises:
means for performing an Rank Indicator (RI) detection to identify the Rank Indicator (RI);
means for performing a Channel Quality Indicator (CQI) detection to detect the Channel Quality Indicator (CQI);
means for performing the Rank Indicator (RI) detection and the Channel Quality Indicator (CQI) detection in parallel, wherein the Channel Quality Indicator (CQI) detected with the Rank Indicator (RI) is at least one of a value of one or a value greater than one;
means for employing a Channel Quality Indicator (CQI) Circular Redundancy Check (CRC) that provides a corresponding Rank Indicator (RI);
means for evaluating the identified Rank Indicator (RI) with the corresponding Rank Indicator (RI); and
means for performing decoding of the portion of data when the identified Rank Indicator (RI) is consistent with the corresponding Rank Indicator (RI).

15. The wireless communications apparatus of claim 14, further comprising means for declaring at least one of the Rank Indicator (RI) or the Channel Quality Indicator (CQI) is in error when the identified Rank Indicator (RI) is not consistent with the corresponding Rank Indicator (RI).

16. The wireless communications apparatus of claim 15, further comprising means for clearing a Log Likelihood Ratio (LLR) in a sub-frame related to the Physical Uplink Shared Channel (PUSCH) transmission.

17. A method used in a wireless communications system that facilitates creating a package of information that enables error-free decoding related to a Physical Uplink Shared Channel (PUSCH) transmission, comprising:
selecting a packaged arrangement for a Physical Uplink Shared Channel (PUSCH) transmission within a subframe, wherein the packaged arrangement includes a Rank Indicator (RI) and a Channel Quality Indicator (CQI);
organizing at least the Rank Indicator (RI) and the Channel Quality Indicator (CQI) based upon the selected packaged arrangement in order to enable decoding of the Physical Uplink Shared Channel (PUSCH) transmission without error; and
communicating the packaged arrangement to a eNodeB, wherein the packaged arrangement enables the eNodeB to decode the Rank Indicator (RI) without error,
wherein the packaged arrangement comprises:
inserting at least one Channel Quality Indicator (CQI) bit at an end of the sub-frame; and
employing a data rate-match around the Channel Quality Indicator (CQI).

18. A method used in a wireless communications system that facilitates creating a package of information that enables error-free decoding related to a Physical Uplink Shared Channel (PUSCH) transmission, comprising:
selecting a packaged arrangement for a Physical Uplink Shared Channel (PUSCH) transmission within a sub-frame, wherein the packaged arrangement includes a Rank Indicator (RI) and an acknowledgement (ACK);
organizing at least the Rank Indicator (RI) and the acknowledgement (ACK) based upon the selected packaged arrangement in order to enable decoding of the Physical Uplink Shared Channel (PUSCH) transmission without error; and
communicating the packaged arrangement to a eNodeB, wherein the packaged arrangement enables the eNodeB to decode the Rank Indicator (RI) without error,
wherein the packaged arrangement further comprises inserting an acknowledgement (ACK) symbol starting from a first sub-carrier in an assigned bandwidth while maintaining a Rank Indicator (RI) position unchanged.

19. A method used in a wireless communications system that facilitates creating a package of information that enables error-free decoding related to a Physical Uplink Shared Channel (PUSCH) transmission, comprising:
selecting a packaged arrangement for a Physical Uplink Shared Channel (PUSCH) transmission within a sub-frame, wherein the packaged arrangement includes at least a Rank Indicator (RI) and an acknowledgement (ACK);
organizing at least the Rank Indicator (RI) and the acknowledgement (ACK) based upon the selected packaged arrangement in order to enable decoding of the Physical Uplink Shared Channel (PUSCH) transmission without error; and
communicating the packaged arrangement to a eNodeB, wherein the packaged arrangement enables the eNodeB to decode the Rank Indicator (RI) without error,
wherein the packaged arrangement further comprises inserting a Rank Indicator (RI) symbol and an acknowledgement (ACK) symbol starting from a first sub-carrier in an assigned bandwidth.

20. A method used in a wireless communications system that facilitates creating a package of information that enables error-free decoding related to a Physical Uplink Shared Channel (PUSCH) transmission, comprising:
selecting a packaged arrangement for a Physical Uplink Shared Channel (PUSCH) transmission within a sub-frame, wherein the packaged arrangement includes at least a Rank Indicator (RI) and a Channel Quality Indicator (CQI);
organizing at least the Rank Indicator (RI) and the Channel Quality Indicator (CQI) based upon the selected packaged arrangement in order to enable decoding of the Physical Uplink Shared Channel (PUSCH) transmission without error; and
communicating the packaged arrangement to a eNodeB, wherein the packaged arrangement enables the eNodeB to decode the Rank Indicator (RI) without error,
wherein the packaged arrangement comprises fixing a Channel Quality Indicator (CQI) symbol in the sub-frame.

21. A method used in a wireless communications system that facilitates creating a package of information that enables error-free decoding related to a Physical Uplink Shared Channel (PUSCH) transmission, comprising:
selecting a packaged arrangement for a Physical Uplink Shared Channel (PUSCH) transmission within a sub-frame, wherein the packaged arrangement includes at least a Rank Indicator (RI) and a Channel Quality Indicator (CQI);
organizing at least the Rank Indicator (RI) and the a Channel Quality Indicator (CQI) based upon the selected packaged arrangement in order to enable decoding of the Physical Uplink Shared Channel (PUSCH) transmission without error; and
communicating the packaged arrangement to a eNodeB, wherein the packaged arrangement enables the eNodeB to decode the Rank Indicator (RI) without error,
wherein the packaged arrangement comprises:
inserting a Channel Quality Indicator (CQI) bit at a first end of the sub-frame; and
employing a data rate-match around the Channel Quality Indicator (CQI) starting at a second end of the sub-frame.

22. A method used in a wireless communications system that facilitates creating a package of information that enables error-free decoding related to a Physical Uplink Shared Channel (PUSCH) transmission, comprising:
selecting a packaged arrangement for a Physical Uplink Shared Channel (PUSCH) transmission within a sub-frame, wherein the packaged arrangement includes a Rank Indicator (RI) and at least one of a Channel Quality Indicator (CQI), a portion of data, or an acknowledgement (ACK);
organizing at least two or more of the Rank Indicator (RI), the Channel Quality Indicator (CQI), the portion of data, or the acknowledgement (ACK) based upon the selected packaged arrangement in order to enable decoding of the Physical Uplink Shared Channel (PUSCH) transmission without error; and
communicating the packaged arrangement to a eNodeB, wherein the packaged arrangement enables the eNodeB to decode the Rank Indicator (RI) without error,
further comprising decoding the packaged arrangement based at least in part upon an organization of the selected packaged arrangement.

23. A wireless communications apparatus, comprising:
at least one processor configured to:
create a package of data for a Physical Uplink Shared Channel (PUSCH) transmission within a sub-frame, wherein the package of data includes at least a Rank Indicator (RI) and a Channel Quality Indicator (CQI);
organize the package of data in an arrangement such that a decoding of the Physical Uplink Shared Channel (PUSCH) transmission is made without error;

communicate the packaged arrangement to a eNodeB, wherein the packaged arrangement enables the eNodeB to decode the Rank Indicator (RI) without error; and a memory coupled to the at least one processor, wherein the package of data comprises:

at least one processor configured to:

insert at least one Channel Quality Indicator (CQI) bit at an end of the sub-frame; and employ a data rate-match around the Channel Quality Indicator (CQI).

24. A wireless communications apparatus, comprising:

at least one processor configured to:

create a package of data for a Physical Uplink Shared Channel (PUSCH) transmission within a sub-frame, wherein the package of data includes at least a Rank Indicator (RI) and an acknowledgement (ACK);

organize the package of data in an arrangement such that a decoding of the Physical Uplink Shared Channel (PUSCH) transmission is made without error;

communicate the packaged arrangement to a eNodeB, wherein the packaged arrangement enables the eNodeB to decode the Rank Indicator (RI) without error; and a memory coupled to the at least one processor, wherein the package of data further comprises at least one processor configured to insert an acknowledgement (ACK) symbol starting from a first sub-carrier in an assigned bandwidth while maintaining a Rank Indicator (RI) position unchanged.

25. A wireless communications apparatus, comprising:

at least one processor configured to:

create a package of data for a Physical Uplink Shared Channel (PUSCH) transmission within a sub-frame, wherein the package of data includes at least a Rank Indicator (RI) and an acknowledgement (ACK);

organize the package of data in an arrangement such that a decoding of the Physical Uplink Shared Channel (PUSCH) transmission is made without error;

communicate the packaged arrangement to a eNodeB, wherein the packaged arrangement enables the eNodeB to decode the Rank Indicator (RI) without error; and a memory coupled to the at least one processor, wherein the package of data further comprises at least one processor configured to insert a Rank Indicator (RI) symbol and an acknowledgement (ACK) symbol starting from a first sub-carrier in an assigned bandwidth.

26. A wireless communications apparatus that creates a package of information that enables error-free decoding related to a Physical Uplink Shared Channel (PUSCH) transmission, comprising:

means for selecting a packaged arrangement for a Physical Uplink Shared Channel (PUSCH) transmission within a sub-frame, wherein the packaged arrangement includes at least a Rank Indicator (RI) and a Channel Quality Indicator (CQI);

means for organizing at least the Rank Indicator (RI) and the Channel Quality Indicator (CQI) based upon the selected packaged arrangement in order to enable decoding of the Physical Uplink Shared Channel (PUSCH) transmission without error; and means for communicating the packaged arrangement to a eNodeB, wherein the packaged arrangement enables the eNodeB to decode the Rank Indicator (RI) without error, wherein the packaged arrangement comprises:

means for inserting at least one Channel Quality Indicator (CQI) bit at an end of the sub-frame; and means for employing a data rate-match around the Channel Quality Indicator (CQI).

27. A wireless communications apparatus that creates a package of information that enables error-free decoding related to a Physical Uplink Shared Channel (PUSCH) transmission, comprising:

means for selecting a packaged arrangement for a Physical Uplink Shared Channel (PUSCH) transmission within a sub-frame, wherein the packaged arrangement includes at least a Rank Indicator (RI) and acknowledgement (ACK);

means for organizing at least the Rank Indicator (RI) and the acknowledgement (ACK) based upon the selected packaged arrangement in order to enable decoding of the Physical Uplink Shared Channel (PUSCH) transmission without error; and means for communicating the packaged arrangement to a eNodeB, wherein the packaged arrangement enables the eNodeB to decode the Rank Indicator (RI) without error, wherein the packaged arrangement further comprises means for inserting an acknowledgement (ACK) symbol starting from a first sub-carrier in an assigned bandwidth while maintaining a Rank Indicator (RI) position unchanged.

28. A wireless communications apparatus that creates a package of information that enables error-free decoding related to a Physical Uplink Shared Channel (PUSCH) transmission, comprising:

means for selecting a packaged arrangement for a Physical Uplink Shared Channel (PUSCH) transmission within a sub-frame, wherein the packaged arrangement includes at least a Rank Indicator (RI) and an acknowledgement (ACK);

means for organizing at least the Rank Indicator (RI) and the acknowledgement (ACK) based upon the selected packaged arrangement in order to enable decoding of the Physical Uplink Shared Channel (PUSCH) transmission without error; and means for communicating the packaged arrangement to a eNodeB, wherein the packaged arrangement enables the eNodeB to decode the Rank Indicator (RI) without error, wherein the packaged arrangement further comprises means for inserting a Rank Indicator (RI) symbol and an acknowledgement (ACK) symbol starting from a first sub-carrier in an assigned bandwidth.

29. A wireless communications apparatus that creates a package of information that enables error-free decoding related to a Physical Uplink Shared Channel (PUSCH) transmission, comprising:

means for selecting a packaged arrangement for a Physical Uplink Shared Channel (PUSCH) transmission within a sub-frame, wherein the packaged arrangement includes at least a Rank Indicator (RI) and a Channel Quality Indicator (CQI);

means for organizing at least the Rank Indicator (RI) and the Channel Quality Indicator (CQI) based upon the selected packaged arrangement in order to enable decoding of the Physical Uplink Shared Channel (PUSCH) transmission without error; and means for communicating the packaged arrangement to a eNodeB, wherein the packaged arrangement enables the eNodeB to decode the Rank Indicator (RI) without error, wherein the packaged arrangement comprises means for fixing a Channel Quality Indicator (CQI) symbol in the sub-frame.

30. A wireless communications apparatus that creates a package of information that enables error-free decoding related to a Physical Uplink Shared Channel (PUSCH) transmission, comprising:

means for selecting a packaged arrangement for a Physical Uplink Shared Channel (PUSCH) transmission within a sub-frame, wherein the packaged arrangement includes at least a Rank Indicator (RI) and a Channel Quality Indicator (CQI);

means for organizing at least the Rank Indicator (RI), and the Channel Quality Indicator (CQI) based upon the selected packaged arrangement in order to enable decoding of the Physical Uplink Shared Channel (PUSCH) transmission without error; and means for communicating the packaged arrangement to a eNodeB, wherein the packaged arrangement enables the eNodeB to decode the Rank Indicator (RI) without error, wherein the packaged arrangement comprises:

means for inserting a Channel Quality Indicator (CQI) bit at a first end of the sub-frame; and mean for employing a data rate-match around the Channel Quality Indicator (CQI) starting at a second end of the sub-frame.

31. A wireless communications apparatus that creates a package of information that enables error-free decoding related to a Physical Uplink Shared Channel (PUSCH) transmission, comprising:

means for selecting a packaged arrangement for a Physical Uplink Shared Channel (PUSCH) transmission within a sub-frame, wherein the packaged arrangement includes a Rank Indicator (RI) and at least one of a Channel Quality Indicator (CQI), a portion of data, or an acknowledgement (ACK);

means for organizing at least two or more of the Rank Indicator (RI), the Channel Quality Indicator (CQI), the portion of data, or the acknowledgement (ACK) based upon the selected packaged arrangement in order to enable decoding of the Physical Uplink Shared Channel (PUSCH) transmission without error; and means for communicating the packaged arrangement to a eNodeB, wherein the packaged arrangement enables the eNodeB to decode the Rank Indicator (RI) without error, further comprising means for decoding the packaged arrangement based at least in part upon an organization of the selected packaged arrangement.

32. A computer program product, comprising:

a non-transitory computer-readable medium comprising:

code for causing at least one computer to create a package of data for a Physical Uplink Shared Channel (PUSCH) transmission within a sub-frame, wherein the package of data includes at least a Rank Indicator (RI) and a Channel Quality Indicator (CQI)

code for causing at least one computer to organize the package of data in an arrangement such that a decoding of the Physical Uplink Shared Channel (PUSCH) transmission is made without error; and code for causing at least one computer to communicate the packaged arrangement to a eNodeB, wherein the packaged arrangement enables the eNodeB to decode the Rank Indicator (RI) without error, wherein the package of data comprises code for:

code for causing at least one computer to insert at least one Channel Quality Indicator (CQI) bit at an end of the sub-frame; and code for causing at least one computer to employ a data rate-match around the Channel Quality Indicator (CQI).

33. A computer program product, comprising:

a non-transitory computer-readable medium comprising:

code for causing at least one computer to create a package of data for a Physical Uplink Shared Channel (PUSCH) transmission within a sub-frame, wherein the package of data includes at least a Rank Indicator (RI) and an acknowledgement (ACK);

code for causing at least one computer to organize the package of data in an arrangement such that a decoding of the Physical Uplink Shared Channel (PUSCH) transmission is made without error; and code for causing at least one computer to communicate the packaged arrangement to a eNodeB, wherein the packaged arrangement enables the eNodeB to decode the Rank Indicator (RI) without error, wherein the package of data further comprises code for causing at least one computer to insert an acknowledgement (ACK) symbol starting from a first sub-carrier in an assigned bandwidth while maintaining a Rank Indicator (RI) position unchanged.

34. A computer program product, comprising:

a non-transitory computer-readable medium comprising:

code for causing at least one computer to create a package of data for a Physical Uplink Shared Channel (PUSCH) transmission within a sub-frame, wherein the package of data includes at least a Rank Indicator (RI) and an acknowledgement (ACK);

code for causing at least one computer to organize the package of data in an arrangement such that a decoding of the Physical Uplink Shared Channel (PUSCH) transmission is made without error; and code for causing at least one computer to communicate the packaged arrangement to a eNodeB, wherein the packaged arrangement enables the eNodeB to decode the Rank Indicator (RI) without error, wherein the package of data further comprises code for causing at least one computer to insert a Rank Indicator (RI) symbol and an acknowledgement (ACK) symbol starting from a first sub-carrier in an assigned bandwidth.

* * * * *